United States Patent [19]
Aranibar

[11] Patent Number: 5,454,760
[45] Date of Patent: Oct. 3, 1995

[54] PRECISION PULLEY WHEEL

[76] Inventor: Ernesto Aranibar, Apt. 2101 Quayside Touers, Miami, Fla. 33138

[21] Appl. No.: 333,332

[22] Filed: Nov. 2, 1994

[51] Int. Cl.$^6$ .................................................. F16H 55/00
[52] U.S. Cl. ...................... 474/166; 29/892.11; 474/181
[58] Field of Search ................................... 474/166–168, 474/174, 176, 181, 902; 29/512, 892.11

[56] References Cited

U.S. PATENT DOCUMENTS 3,094,881  6/1963  Schultz, Jr. .............................. 474/181
3,898,888  8/1975  Frost et al. .............................. 474/181

*Primary Examiner*—Michael Powell Buiz
*Attorney, Agent, or Firm*—William F. Hamrock

[57] ABSTRACT

A method and construction of forming a pulley wheel mounted on a shaft. The pulley includes a pair of identical discs fused back to back by laser welding forming a pulley wheel with a peripheral groove and axial central opening. The pulley wheel is mounted on the shaft having a serrated or toothed exterior surface.

17 Claims, 3 Drawing Sheets

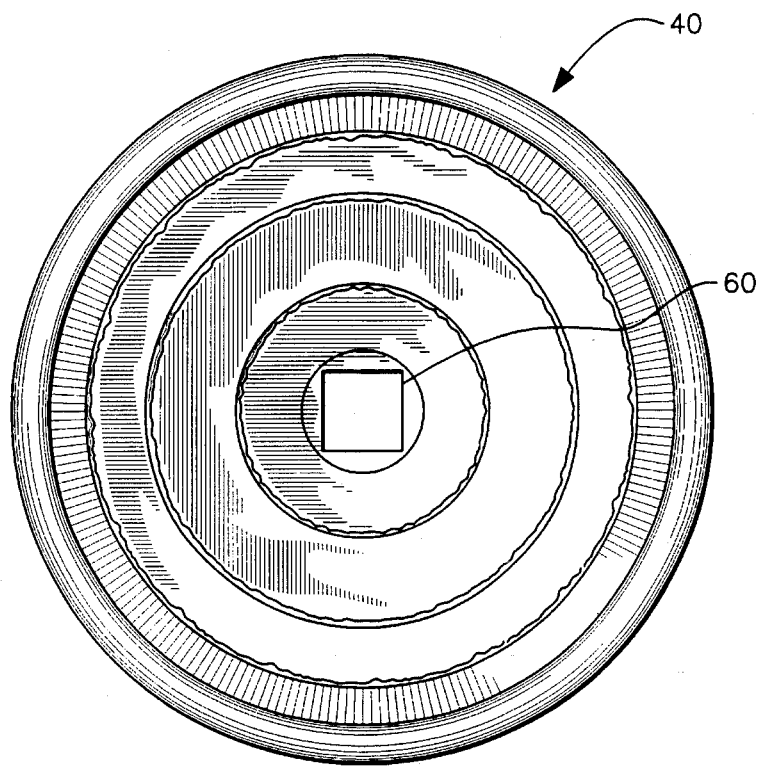
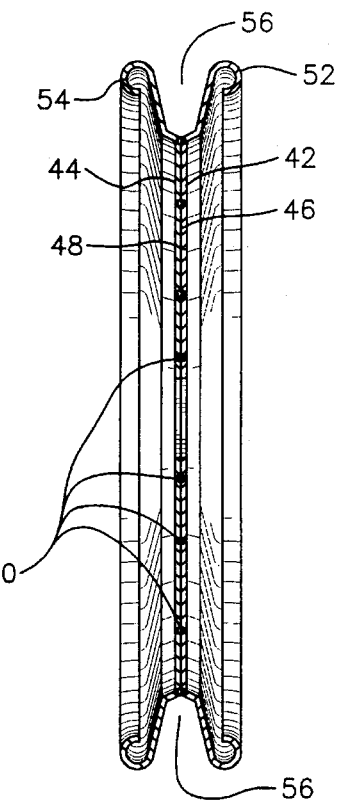
FIG. 4
FIG. 5
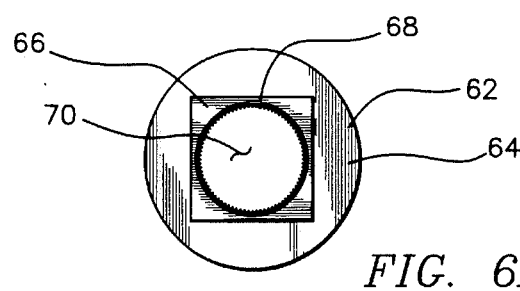
FIG. 6A
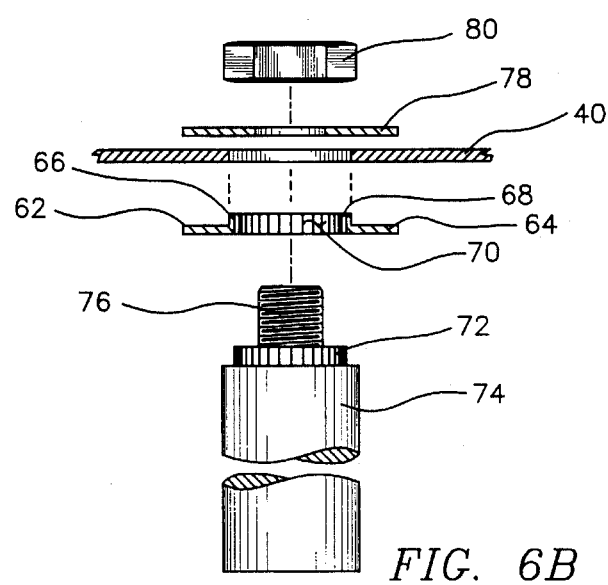
FIG. 6B

PRECISION PULLEY WHEEL

BACKGROUND OF THE INVENTION

I. Field of the Invention

The invention relates to a method of forming a precision pulley wheel and, more particularly, to forming a pulley wheel secured by laser welding and encompassing a unique hub assembly.

II. Description of the Related Art

Pulley wheels are well known for use with belts such as V-belts. Generally, the pulley wheels are manufactured from a pair of stamped disk members formed from sheet metal by stamping operations on a punch press with various configurations. The disk members can include angularly spaced spoke portions connecting inner and outer annular portions thereof. The disk members are secured together, back to back, forming an outer annular belt receiving groove and are spot welded or otherwise secured to a central hub member.

The disk members are secured together by various methods that have been found to have many disadvantages. In the split steel method, the sheet metal disc is clamped on a rotating shaft after which a hard steel roller force splits the material which is then formed into shape. The high pressure resulting from the process creates extreme heat conditions causing deformation and crystallization of the metal. The result is that the manufactured pulley wheels are not true running and the manufacturing process is slow and expensive.

In the brazing method, the disk members being secured together are subjected to the extreme heat of a brazing furnace which causes distortion of the metal. The result is that there is a high percentage of breakage due to inconsistency of the material, the process is expensive to run and the pulley wheels are not true running.

In the method combining resistance welding and brazing, the disk members are spot welded together and the hubs are brazed to washers and the washer projections are welded to the pulley wheel. The result is that there is a large amount of distortion and breakage of the metal, the process is expensive and the pulley wheels are not true running.

The manufacture of pulley wheels is known to be an extremely competitive industry. There is a continuous need for improved methods which will improve the durability of the pulley wheel, decrease the manufacturing costs and produce a true running pulley wheel.

As can be readily ascertained from the foregoing, various improvements in the method of manufacture and construction of pulley wheels are desirable.

It is a general object of the present invention to provide an improved method for manufacturing pulley wheels.

It is a particular object of the present invention to provide improved pulley wheels.

It is a further object of the present invention to provide a method of manufacturing pulley wheels which eliminates the use of high temperatures which causes deterioration of the metal.

It is another object of the present invention to provide a method which will increase the durability of the pulley wheels.

It is another further object of the present invention to provide an improved method of securing a hub to the pulley wheel.

It is yet another object of the present invention to provide a method which will reduce the cost of manufacturing the pulley wheels.

SUMMARY OF THE INVENTION

The present invention relates to an improved method and construction of pulley wheels.

In accordance with the invention, the pulley wheel includes a pair of stamped disks which are fused together, back to back, by laser welding as opposed to the related art split steel method, brazing method and welding method such as spot welding. The fused disk members generally include a plurality of triangularly shaped openings, a peripheral belt receiving groove and a hub central opening.

In the first embodiment of the improved pulley wheel, its central opening consists of a smooth circular axial bore which fits over a shaft which has a serrated or toothed outer surface. The diameter of the axial bore of the pulley wheel is slightly less than that of the shaft's serrated or toothed surface so that as the pulley wheel is forced onto the shaft, the shaft's serrated surface bites into the surface of the pulley wheel's axial bore thereby forming a secure joinder between the pulley wheel and the shaft. A nut preferably preceded by a washer is threaded onto the shaft and tightened against the pulley wheel to further secure the pulley onto the shaft.

In the second embodiment, the axial central opening of the pulley wheel is a smooth square hole. A circular coupling which encompasses a projecting square insert is mounted on a serrated extension on the shaft. The projecting square insert includes a serrated or toothed circular axial bore which locks with the serrated or toothed extension of the shaft. The pulley wheel is mounted on the shaft by inserting the shaft's square hole onto the projecting square insert of the circular coupling. The projecting square insert is preferably made from inexpensive powdered iron ore. As the serrated extension is forced into the axial bore of the projecting square insert a secure joinder of the two components is effected. A washer and nut which is threaded onto the shaft and tightened against the insert further secures the pulley wheel to the shaft.

BRIEF DESCRIPTION OF THE DRAWINGS

The invention will be further understood by reference the following disclosure and the accompanying drawings.

FIG. 4 is a side elevational view of a pulley wheel in accordance with the second embodiment of the invention.

FIG. 5 is a front elevational view of the pulley wheel in FIG. 4.

FIG. 6A is a front elevational view of the circular coupling of the second embodiment of the invention.

FIG. 6B is an exploded view of the assembly of the circular coupling onto the pulley wheel of the second embodiment of the invention.

DETAILED DESCRIPTION OF THE PREFERRED EMBODIMENTS

Figure 1:
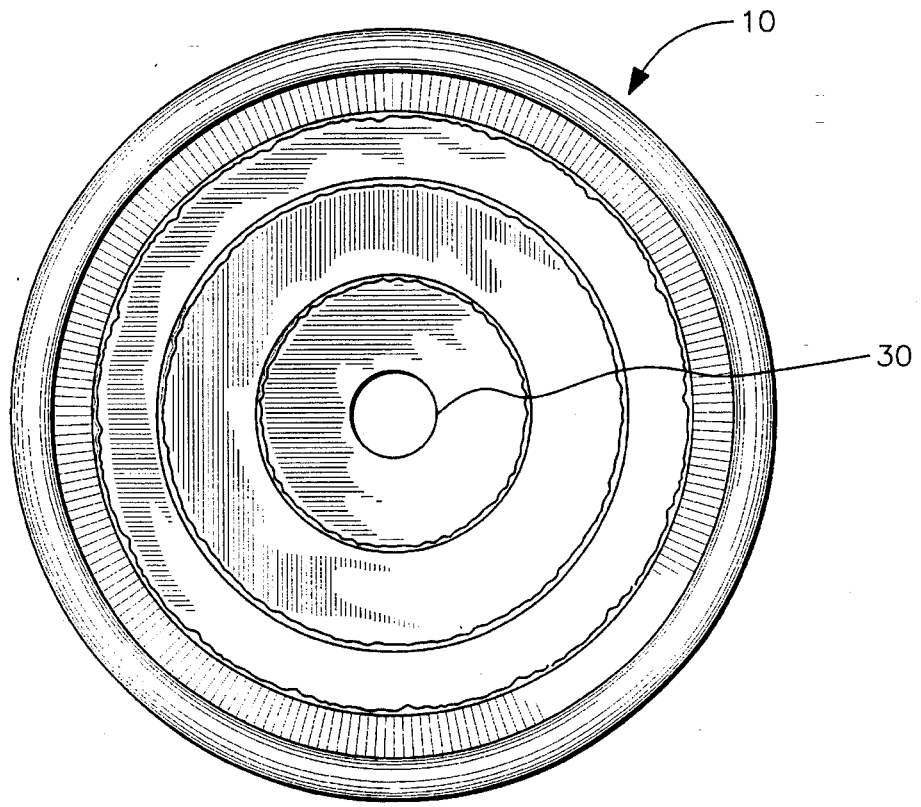
FIG. 1 is a side elevational view of a pulley wheel made according to a first embodiment of my invention.
Figure 2:
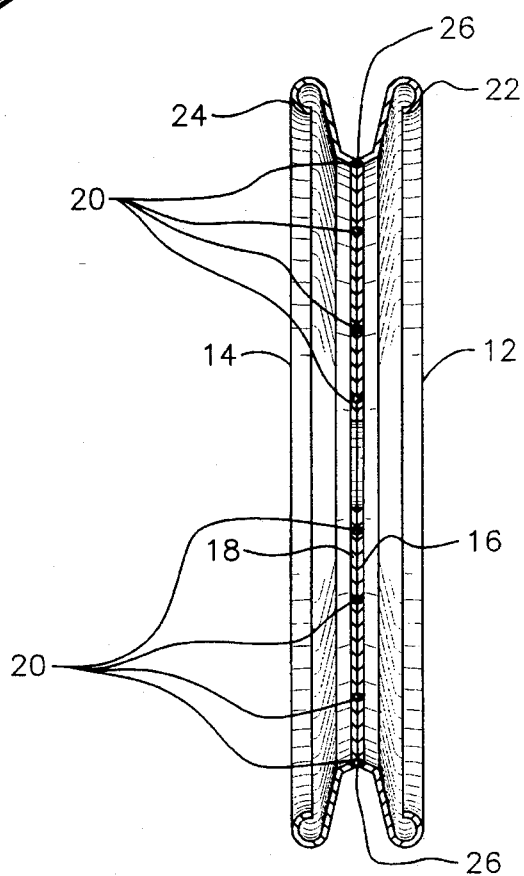
FIG. 2 is a front elevational view of the pulley wheel in FIG. 1.
Figure 3A:
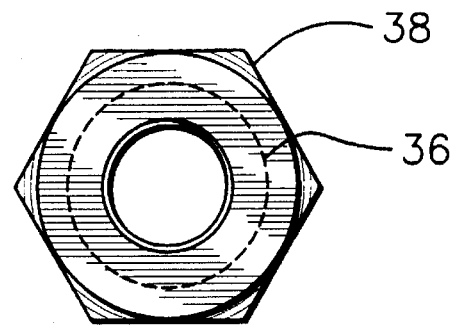
FIG. 3A is an end view of the assembly of the hub onto the pulley wheel of the first embodiment of the invention.
Figure 3B:
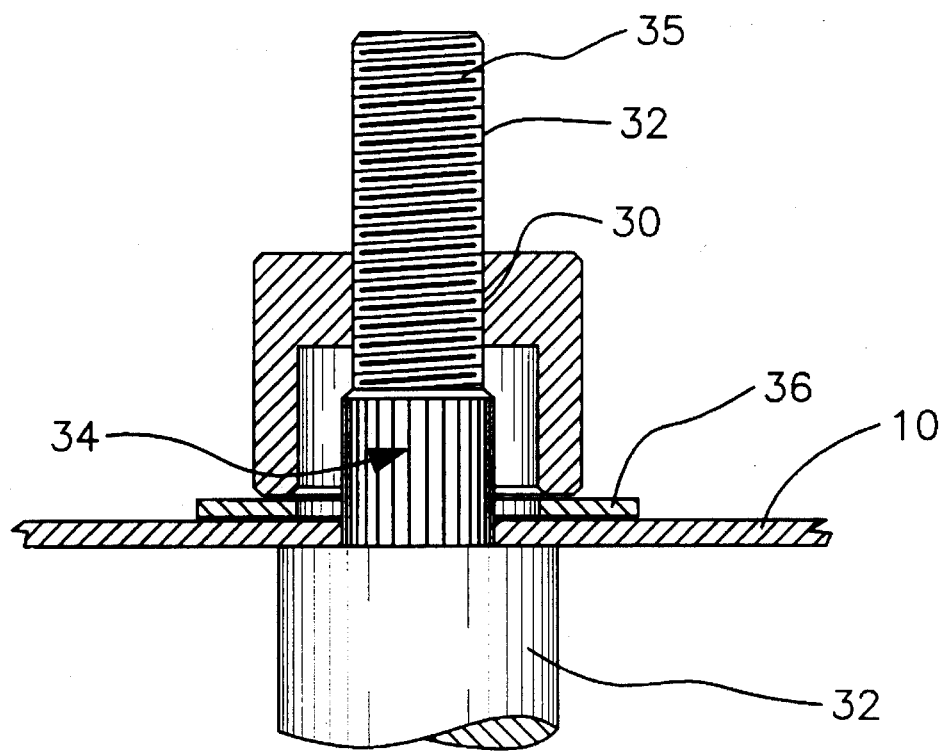
FIG. 3B is a side view of the assembly of the hub onto the pulley wheel of the first embodiment of the invention.
Figure 3B:
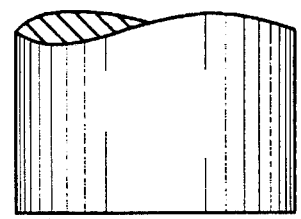

Referring to the drawings in detail and the numerals referenced therein, the first embodiment of the invention is illustrated in FIGS. 1, 2 and 3. Pulley wheel 10 is indicated having a pair of identical stamped discs 12 and 14 fabricated from a flat sheet of metal. The discs are joined together back to back by laser welding along their joints 16 and 18 as shown by a multiple laser welds 20. The joined discs form expanded outward portions 22 and 24 forming a belt receiving groove 26.

The use of laser welding eliminates warpage of the pulley wheel discs since the high temperature applied during the laser welding operation is so precise and concentrated, there is a minimal effected zone. The joints 16 and 18 are completely fused together so that the metal itself would tear before the welds 22 and 24 would break. The result is that pulley wheels made according to my invention are true running. Thus, the present improved method off laser welding is an immense improvement over related art methods previously used in the fabrication of pulley wheels.

Shown in the center of the joined discs is hub central opening forming a smooth circular axial bore 30. As seen in FIGS. 3A and 3B, the axial bore 30 fits over the serrated or toothed exterior surface portion 34 of shaft 32. The diameter of axial bore 30 is made slightly less than the diameter of the serrated or toothed exterior surface 34 of the shaft. Thus, the pulley, wheel 10 must be forced onto shaft 32 resulting in the serrated or toothed surface 34 biting into the surface of axial bore 30 to form a tight fitting. A large washer 36 is then placed on the shaft and secured in place against the pulley wheel axial bore 30 by nut 38 threaded onto the threaded end portion 35 of the shaft.

The present first embodiment of the invention eliminates the need of elaborate and expensive hubs. The improved pulley wheel 10 is of a simple device that eliminates the use of key ways generally required on related art hubs and shafts.

FIGS. 4, 5 and 6 illustrate the second embodiment of the invention. Pulley wheel 40 is similar to pulley wheel 10 in that it has a pair of identical stamped discs 42 and 44 fabricated from sheet metal. Discs 42 and 44 are likewise joined together back to back by laser welding along joints 46 and 48 as shown by laser welds 50. Joined discs 42 and 44 include expanded outward portions 52 and 54 forming a belt receiving groove 56.

The laser welding in the present second embodiment has all the advantages cited for its use as in the first embodiment discussed previously.

The second embodiment differs from the first embodiment in its axial opening configuration. Shown in the center of the joined discs 42 and 44 forming pulley wheel 40 is axial central opening in the form of a smooth square axial hole 60. FIG. 6A depicts circular coupling 62 designed to fit into the square hole 60. Circular coupling 62 which includes a circular seat 64 encompassing projecting square insert 66 having a central circular opening 68 with a serrated or toothed surface 70. Circular coupling 62 as shown in FIG. 6B is mounted on the circular serrated extension 72 of shaft 74 where the serrated or toothed surface 70 of projecting square insert 66 is forcefully mated with the serrated surface of extension 72. Pulley wheel 40 is then secured to circular coupling 62 by mounting square axial hole 60 of the shaft onto projecting square insert 66. Insert 66 is preferably fabricated from inexpensive powdered iron ore which causes a tight fit on mating with the circular serrated extension 72 of the shaft. Washer nut 78 and 80 which threadedly secures the pulley wheel and circular coupling 62 onto threaded surface 76.

Having now described the invention, it will be apparent to one of ordinary skill in the art that many changes and modifications can be made thereto without departing from the spirit and scope of the invention defined by the following claims.

What is claimed is:

1. A method of forming a precision pulley wheel on a shaft comprising forming a pair of identical discs from a flat metal sheet, fusing said discs back to back by laser welding to form a pulley wheel having a continuous peripheral belt receiving groove and an axial central opening, and securing the pulley wheel onto a shaft which has a serrated or toothed exterior surface.

2. The method according to claim 1 wherein the axial central opening is a smooth circular axial bore which is forced onto the serrated or toothed exterior surface of said shaft, whereby the exterior serrated or toothed surface bites into the axial bore to form a tight fit.

3. The method according to claim 2 wherein said pulley wheel is further secured to the shaft by a washer and a nut threaded onto the shaft.

4. The method according to claim 1 wherein the pulley wheel axial central opening comprises a smooth square axial opening.

5. The method according to claim 4 wherein a circular coupling encompassing a projecting square insert having a serrated or toothed central circular axial bore mounted onto said serrated or toothed shaft surface.

6. The method according to claim 5 wherein said projecting square insert is comprises powdered iron ore.

7. The method according to claim 6 wherein said serrated or toothed circular axial bore of said projecting square insert mates with said serrated or toothed exterior surface of said shaft.

8. The method according to claim 7 wherein said pulley wheel is further secured to the shaft by a washer and a nut which is threaded onto the shaft.

9. The combination of a pulley wheel and a shaft having a serrated or toothed exterior surface comprising a pair of identical discs formed from a flat metal sheet and fused back to back by laser welding forming a pulley wheel having a continuous peripheral belt receiving groove and an axial central opening, said pulley wheel being securely mounted on said shaft by means of the serrated or toothed exterior surface of the shaft.

10. The combination according to claim 9 wherein the axial central opening is a circular axial bore which is forced onto said shafts' serrated or toothed exterior surface.

11. The combination according to claim 10 in which the diameter of said axial bore of the pulley wheel is slightly smaller than the serrated or toothed exterior surface of the shaft.

12. The combination according to claim 11 wherein said pulley wheel is further secured by a washer and a nut threaded onto the shaft.

13. The combination according to claim 9 wherein said axial central opening comprises a smooth square axial hole.

14. The pulley wheel according to claim 13 wherein a circular coupling encompassing a protruding square insert having a serrated or toothed central circular axial bore is mounted onto said serrated or toothed shaft surface.

15. The pulley wheel according to claim 14 wherein said projecting square insert comprises powdered iron ore.

16. The combination according to claim 15 wherein said serrated or toothed circular axial bore of said projecting square insert mates with said serrated or toothed exterior surface of said shaft.

17. The combination according to claim 16 wherein said pulley wheel is secured to the shaft by a washer and a nut which is threaded onto the shaft.

* * * * *